US007213512B2

(12) United States Patent
Braun et al.

(10) Patent No.: US 7,213,512 B2
(45) Date of Patent: May 8, 2007

(54) STEEL GRAVURE METHOD FOR THE PRODUCTION OF A SECURITY DOCUMENT, STEEL GRAVURE PLATE AND SEMI-PRODUCT FOR THE SAME AND METHOD FOR PRODUCTION THEREOF

(75) Inventors: Eckhard Braun, Rodgau-Nieder Roden (DE); Reinhard Plaschka, Windach (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/500,924

(22) PCT Filed: Jan. 8, 2003

(86) PCT No.: PCT/EP03/00112

§ 371 (c)(1),
(2), (4) Date: Jul. 8, 2004

(87) PCT Pub. No.: WO03/057494

PCT Pub. Date: Jul. 17, 2003

(65) Prior Publication Data

US 2005/0072326 A1 Apr. 7, 2005

(30) Foreign Application Priority Data

Jan. 11, 2002 (DE) ................................ 102 01 032

(51) Int. Cl.
*B32B 3/00* (2006.01)

(52) U.S. Cl. ...................... 101/153; 101/150; 101/154; 101/170; 101/395

(58) Field of Classification Search ................ 101/150, 101/170, 153, 154, 395
See application file for complete search history.

(56) References Cited

U.S. PATENT DOCUMENTS

| | | | | |
|---|---|---|---|---|
| 5,106,125 | A | 4/1992 | Antes | |
| 5,722,693 | A | 3/1998 | Wicker | |
| 6,176,522 | B1 | 1/2001 | Jackson | |
| 6,811,858 | B1 * | 11/2004 | Mayer et al. | 428/195.1 |
| 6,928,925 | B1 * | 8/2005 | Mayer et al. | 101/150 |
| 2004/0025728 | A1 * | 2/2004 | Adamczyk | 101/395 |
| 2005/0115425 | A1 * | 6/2005 | Plaschka et al. | 101/170 |

FOREIGN PATENT DOCUMENTS

| | | | |
|---|---|---|---|
| DE | 19845436 | A1 * | 4/2000 |
| DE | 100 15 097 | A | 10/2001 |
| WO | WO 00/20217 | * | 4/2000 |

* cited by examiner

*Primary Examiner*—Daniel J. Colilla
*Assistant Examiner*—Kevin D. Williams
(74) *Attorney, Agent, or Firm*—Rothwell, Figg, Ernst & Manbeck, PC

(57) ABSTRACT

A method for producing a security document having printed image 1 produced by steel intaglio printing and embossed microstructures 2 of an order of magnitude of less than 100 microns is carried out by one printing plate 8 on which both the steel intaglio structures and the microstructures are present. The parts of the microstructures closest to printing plate surface 9 are located 20 to 100 microns below the printing plate surface so that they are not touched and destroyed by the wiping cylinder. Alternative methods for producing a steel intaglio printing plate with integrated microstructures are provided. The microstructures can be used for embossing a diffractive relief or a blind embossing.

8 Claims, 3 Drawing Sheets

Figure 1:
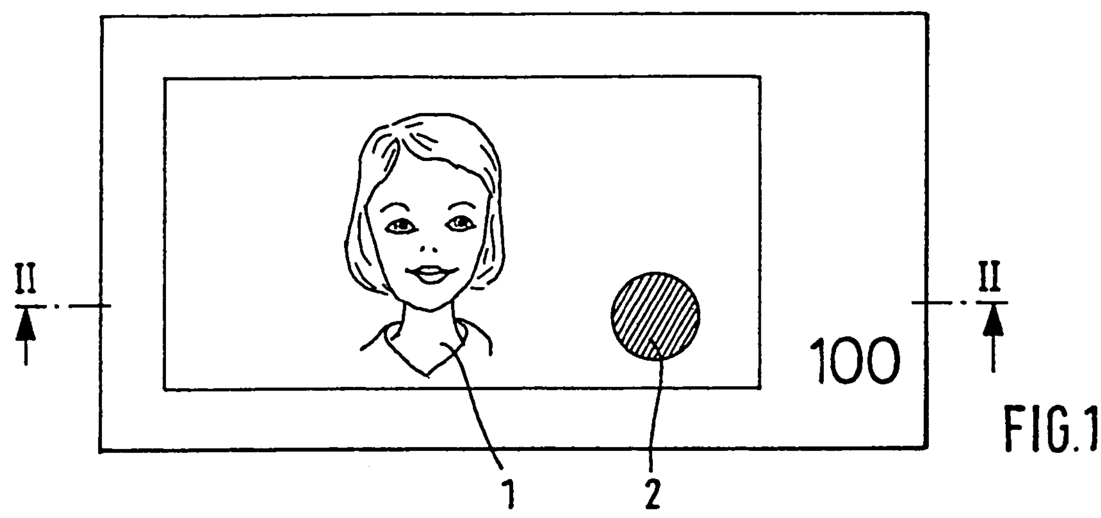

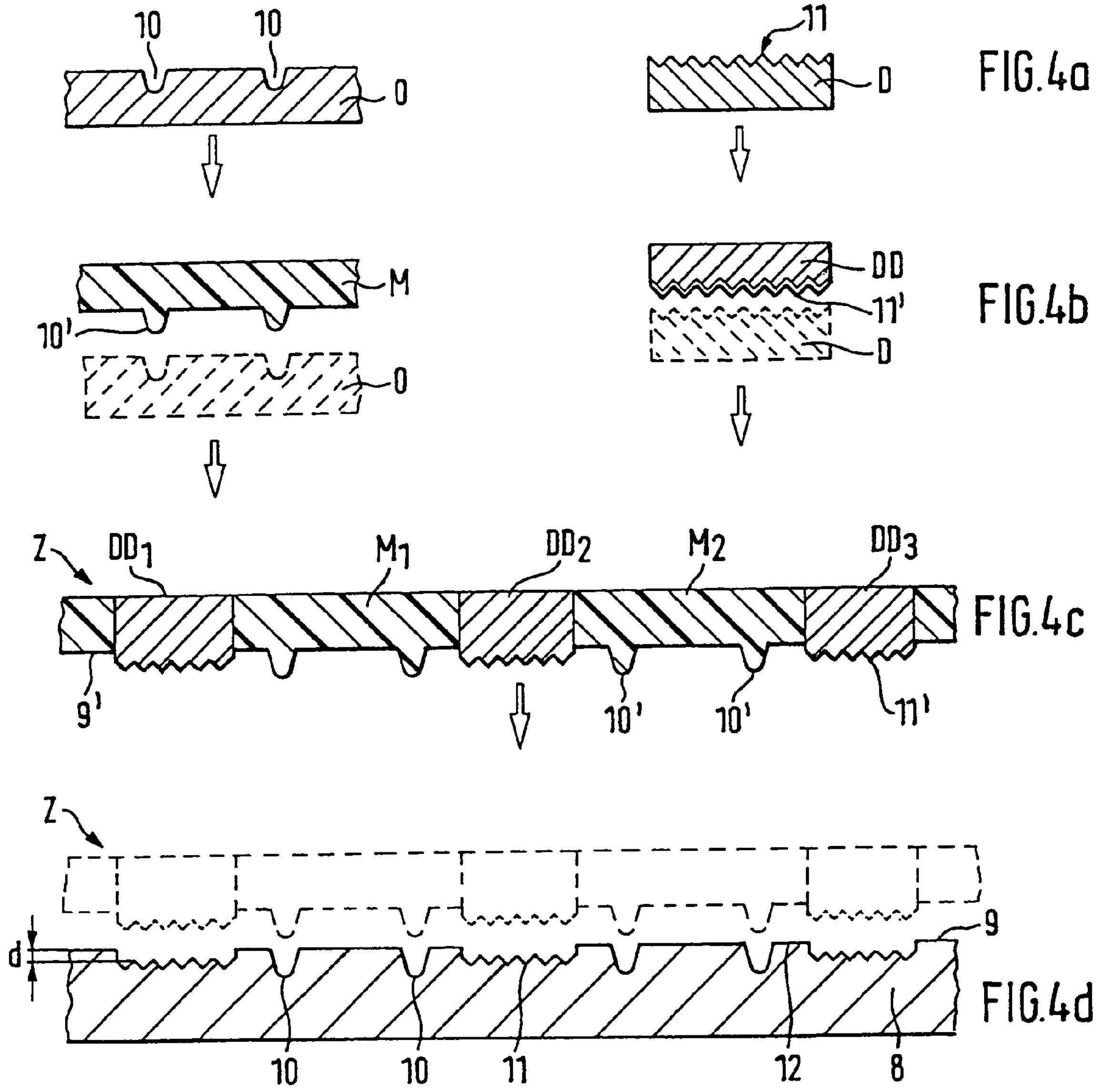
FIG.4a
FIG.4b
FIG.4c
FIG.4d
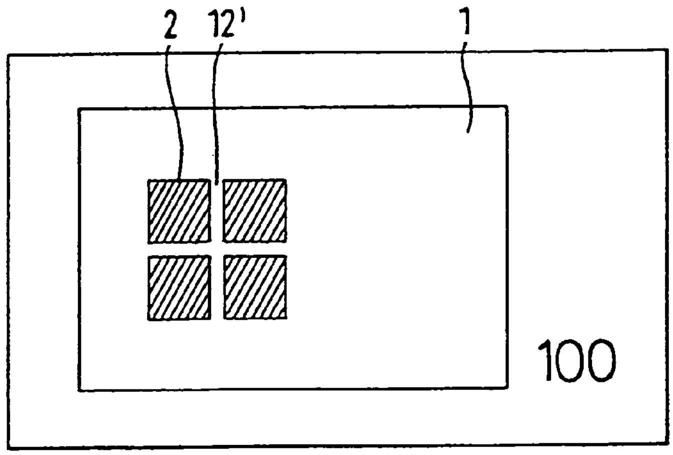
FIG.5

STEEL GRAVURE METHOD FOR THE PRODUCTION OF A SECURITY DOCUMENT, STEEL GRAVURE PLATE AND SEMI-PRODUCT FOR THE SAME AND METHOD FOR PRODUCTION THEREOF

CROSS-REFERENCE TO RELATED APPLICATIONS

This application is a §371 of PCT Application Ser. No. PCT/EPO3/00112, filed Jan. 8, 2003.

FIELD OF THE INVENTION

This invention relates to a method for producing a security document, in particular a paper of value such as a bank note, check and the like, having a printed image applied by steel intaglio printing and having an embossed microstructure area whose structures are of an order of magnitude of less than 100 microns. The invention relates in addition to tools suitable for the production method, namely steel intaglio printing plates, and the production thereof including semifinished products, namely originals and molds for producing the steel intaglio printing plates, and the thus produced security documents. Steel intaglio printing corresponds to engraving intaglio printing, the printing plate being made of steel. This obtains higher service life of the plate and permits the high press runs required for security and in particular bank-note printing.

DESCRIPTION OF THE BACKGROUND ART

It is known to equip security documents not only with a printed image applied by steel intaglio printing but also with special authenticity features, those of interest for the present invention being in particular optically variable elements such as embossed holograms or grids (DE-A-40 02 979) and blind embossings (DE-A-198 45 552).

Blind embossings are occasionally produced together with the steel intaglio printed image in a common printing operation using one partially inked steel intaglio printing plate. During the printing operation the paper is pressed into the depressions of the blind embossing areas and thus lastingly deformed. The blind embossing areas of the printing plate are not filled with ink, unlike the printed image areas, so that the substrate material of the security document is only lastingly deformed, i.e. embossed, in these areas (WO 97/48555; DE-A-198 45 552).

When blind embossings are viewed, light and shadow effects produce special three-dimensional optical impressions. In addition, blind embossings with suitable dimensions can also be easily detected tactilely.

The structures for the steel intaglio printed image and for the blind embossings are usually incorporated in the printing plate surface by means of a graver, laser or by etching. Regardless of the incorporation technology used, these structures will also be referred to in general as “engravings” in the following. The fineness of the structures is limited, however, firstly by the employed engraving techniques themselves, but secondly by the fact that especially fine structures do not long withstand the mechanical influences of the wiping cylinder used for wiping surplus ink off the partially inked printing plate. The lightly reciprocating motion and the friction prevailing at a corresponding contact pressure of the wiping cylinder cause embossed structures of an order of magnitude of distinctly less than 100 microns (referred to as “microstructures” in the following) to be damaged within a very short time. Embossings with microstructures distinctly smaller than 100 microns for producing special optical effects are accordingly produced in an embossing operation performed separately from the printing operation for applying the steel intaglio printed image.

The same holds for the application of optical diffraction structures such as holograms and grids. The order of magnitude of these diffraction structures is within the wavelength range of visible light, i.e. under 1 micron. In DE-A-198 45 552 it is proposed that a paper of value be prefabricated with all security elements, including for example embossed diffraction structures, and the paper printed as the last method step for example by steel intaglio printing. It is described in this context as a possible variant that the diffraction structures are built up in layers on a previously locally smoothed area of the paper-of-value substrate by first applying a curable lacquer to the smoothed area and providing it with an extremely thin, reflective metal layer. A diffractive relief structure is then embossed into this coated lacquer layer with an embossing die, and the thus produced diffraction structure then covered with a protective lacquer.

Producing embossed microstructures in a security document, whether as a blind embossing in the substrate material itself or as a diffractive relief structure in a specially provided lacquer layer, thus requires a separate working step in addition to the printing operation for producing the steel intaglio printed image.

SUMMARY OF THE INVENTION

The problem of the present invention is to propose a method for producing a security document that permits steel intaglio printed images and embossed microstructures to be produced more easily.

An additional problem is to propose tools for carrying out the method as well as a method for producing these tools and their semifinished products.

The steel intaglio printed image and the embossed microstructures are accordingly produced in a common printing operation using a common printing plate in which both the printed image engraving and the microstructures are present. In order to prevent the microstructures from being damaged by the action of a wiping cylinder wiping over the printing plate, the microstructures are slightly lowered relative to the printing plate surface so that they are not touched by the wiping cylinder but nevertheless permit a perfect embossing operation. The dimension of recessing of the microstructures depends on the area size of the microstructure area, on the one hand, and the compressibility of the wiping cylinder material and the wiping cylinder contact pressure, on the other hand. The microstructures should therefore be about 20 microns to 100 microns below the printing plate surface, preferably at least 40 microns and at most 60 microns, these specifications relating to the parts of the microstructures closest to the printing plate surface. A square microstructure area should have for example an area of less than 100 square millimeters in order to prevent the wiping cylinder from penetrating down to the deeper microstructures. In other words, the dimension of the microstructure area should be under 10 millimeters in the direction parallel to the rotational axis of the wiping cylinder and parallel to the printing plate surface.

A plurality of microstructure areas can jointly constitute a larger microstructure area, the individual microstructure areas being separated by bars extending as far as the printing plate surface. The bars have a width on the printing plate surface such that they can carry the wiping cylinder without being damaged by its contact pressure after a certain length of time. This permits a grid of any desired shape and size to be produced from smaller microstructure areas.

The dimensions of the microstructures, i.e. their height and/or lateral structural size, are preferably of an order of magnitude between 5 microns and 100 microns if simple blind embossings are to be produced. However, if a diffractive relief structure is to be embossed with the microstructures, for example into an optionally metalized lacquer layer specially applied to the security document material, the order of magnitude of the microstructures is in the wave-optical range at and under 1 micron.

Since the microstructures, due to their small dimensioning, cannot always be produced precisely enough with conventional methods for producing engraved plates, for example by means of graver, laser or by etching, the invention provides a two-stage printing-plate production. First, an original printing plate with the printed image engraving, on the one hand, and one or more embossing dies with the microstructures, on the other hand, are produced separately in conventional fashion, and then the original printing plate or a matrix molded thereon is combined with the original embossing die or dies or embossing die duplicates.

According to a first embodiment, the original printing plate is first used to emboss molds, the matrices. As many matrices are embossed as the finished steel intaglio printing plate is to have copies. A number of duplicates corresponding to the copies of the steel intaglio printing plate is also produced from the microstructure embossing dies. The matrices are then combined with the duplicates of the microstructure embossing dies, for example by being disposed side by side and suitably joined. This complex then serves as the actual mold for copying one or more duplicate printing plates, which are then used as steel intaglio printing plates in the printing mechanisms.

According to another embodiment, one or more areas are removed from the original printing plate in which the printed image is engraved, the original microstructure embossing die or dies being inserted into said areas such that the microstructures are located below the plate surface. The matrices are then constituted by the resulting complex. A number of matrices assembled in the desired arrangement of copies then constitutes the mold for producing the steel intaglio printing plates.

Furthermore, the printing plate can also be engraved directly with the embossing microstructures lowered relative to the unengraved printing plate level. However, this presupposes the use of a precision engraving apparatus since standard devices for engraving intaglio printing plates do not have sufficient precision for reproducibly producing given structures whose dimensions are smaller than 100 microns. Precision engraving can be done both by mechanical, i.e. chip-removing, engraving and by laser engraving.

While the ink-receiving depressions intended for the printed image can be engraved into the printing plate surface in the usual way, the areas intended for the embossing microstructures can first be removed by the value by which the lowering is to be effected. The microstructures are then incorporated by a precision engraving into these areas located below the level of the unmachined printing plate surface. It is fundamentally also possible to first produce the microstructures in the given nominal depth and, if still necessary, then remove any printing plate material left standing to obtain the desired lowering in an area.

The printing plate original provided with the microstructures can be used directly as a combined printing and embossing plate. However, the original can also be duplicated by the usual reproduction and molding techniques.

The inventive intaglio printing plates guarantee trenchant embossed structures with high contour acuity on the papers of value produced therewith even after high press runs.

Due to the very high contact pressure in intaglio printing, the substrate material, for example cotton paper, is compacted and permanently compressed even in the unprinted or unembossed areas. Lowering of the embossing structures in the printing plate causes an uncompressed, or at least less compressed, area in the corresponding area of the machined substrate, with the embossing microstructures rising therefrom. As wearing protection, the embossing microstructures can be provided with stabilizing protective layers.

DETAILED DESCRIPTION OF THE INVENTION

Figure 2:
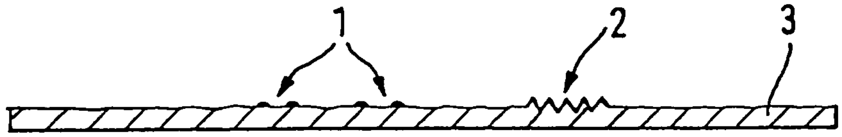
Figure 3A:
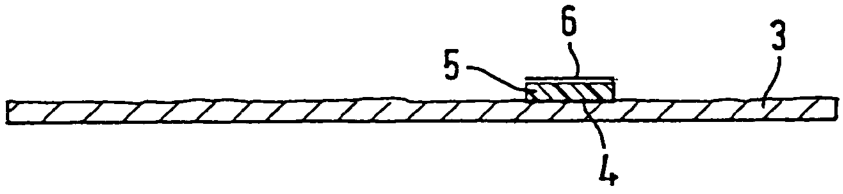
Figure 3B:
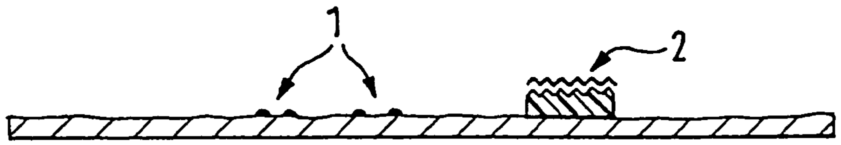
Figure 3C:
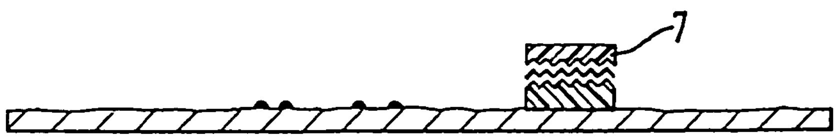

In the following the invention will be described by way of example with reference to the figures, in which:

FIG. 1 shows a bank note with a steel intaglio printed image and embossed microstructures, FIG. 2 shows the bank note from FIG. 1 in cross section, the microstructures being present as a blind embossing, FIGS. 3*a* to 3*c* show the bank note from FIG. 1 in cross section at different production times, the microstructures being present as an optical diffraction pattern, FIGS. 4*a* to 4*d* show the individual steps for producing an inventive steel intaglio printing plate according to a first embodiment, FIG. 5 shows a bank note similar to the bank note from FIG. 1 with a plurality of spaced-apart microstructure areas, and FIGS. 6*a* to 6*e* show the individual steps for producing an inventive steel intaglio printing plate according to a second embodiment.

FIG. 1 shows by way of example as one of many possible types of security documents a bank note in plan view having printed image 1 produced by steel intaglio printing and microstructure embossing 2 likewise produced by steel intaglio. Microstructure embossing 2 can be for example a blind embossing in the paper substrate or a diffractive relief structure in a plastic layer applied to the paper substrate.

FIG. 2 shows a cross section through the bank note from FIG. 1, microstructure embossing 2 being present as a blind embossing in the surface of bank note substrate 3. The ink applied by steel intaglio printing and constituting printed image 1 "stands" on the surface of substrate 3 and is therefore detectable tactilely.

The raised microstructure of microstructure embossing 2 is for example a line screen with a screen width in the range of 5 to 100 microns. Such a structure is visually perceptible as a fine light-and-shadow pattern and the surface might also be distinguishable tactilely from the surrounding, unembossed surface.

FIGS. 3*a* to 3*c* show an example in which microstructure embossing 2 is executed as a diffractive relief structure. In this case the structures have an order of magnitude of about 1 micron or less than 1 micron, that is, in the wavelength range of visible light. FIG. 3*a* shows as yet unprinted bank note substrate 3 which is smoothed in zone 4 so that embossed lacquer 5 adheres to substrate 3 especially well in this area. Embossed lacquer 5 is vacuum metalized with thin metal layer 6. In the next method step, printed image 1, on the one hand, and diffractive microstructure embossing 2, on the other hand, are applied by steel intaglio printing to thus prepared substrate 3 (FIG. 3*b*). Microstructure embossing 2 is then covered with scratch-resistant protective lacquer 7 (FIG. 3*c*).

Printed image 1 and microstructure embossing 2 according to the examples of FIG. 2 and FIGS. 3*a* to 3*c* are produced in one printing operation using one printing plate. Printing plates 8 suitable therefor are shown in cross section in FIGS. 4*d* and 6*e* by way of example. FIG. 4*d* indicates that steel intaglio structures 10 for producing printed image 1, on the one hand, and microstructures 11 for producing microstructure embossing 2, on the other hand, are present in printing plate surface 9. Microstructures 11 are slightly recessed in printing plate surface 9 so that the uppermost microstructure areas, that is, the tips of the microstructure relief, are at small distance d below printing plate surface 9. Distance d measures between 20 and 100 microns, preferably between 40 and 60 microns. For producing a security print, the ink is first applied to printing plate surface 9 partially in the area of steel intaglio structures 10, and surplus ink is wiped off printing plate surface 9 by means of a wiping cylinder not shown. The lowering of microstructures 11 prevents the wiping cylinder from coming in contact with filigree microstructures 11 and damaging them. In the subsequent printing operation the substrate of the security document is pressed into steel intaglio structures 10 and microstructures 11, thereby causing ink to be received from steel intaglio structures 10 and adhere to the substrate surface, on the one hand, and the substrate to be embossed on its surface in the area of microstructures 11, that is, permanently deformed, on the other hand.

The pressures and temperatures of the printing plate cylinder that are used for producing the printed image by steel intaglio printing are suitable for embossing conventional security papers, so that it is readily possible to emboss and print security paper simultaneously with one steel intaglio printing plate. A typical heating temperature of the plate cylinders is approximately 80° C., but it can also be between 50 and 90° C.

In the following, two alternative methods for producing printing plate 8 with deeper microstructures 11 will be described with reference to FIGS. 4*a* to 4*d* and 6*a* to 6*e*.

In a first step (FIG. 4*a*), steel intaglio structures 10 are firstly incorporated in original printing plate O in conventional fashion, for example by means of a graver or by etching. Separately, one or optionally a plurality of different embossing dies D with microstructures 11 are produced likewise in conventional fashion, for example by the same methods usually employed for producing diffractive relief structures.

In a second step (FIG. 4*b*), duplicates are produced from original printing plate O and embossing die D. Production of the duplicate of original printing plate O, that is matrix M, can be effected for example by embossing the original printing plate into a plastically deformable plastic, which then constitutes matrix M (Cobex embossing). However, other molding techniques are also known and usable. A number of matrices $M_1$, $M_2$ . . . , $M_n$ is produced that corresponds to the number of copies of the steel intaglio printing plate to be produced. A corresponding number of embossing die duplicates $DD_1$, $DD_2$, . . . is also produced from embossing die or dies D with microstructures 11. The molding of embossing die duplicates DD is preferably effected by galvanoplasty by first making microstructure 11 electrically conductive and then metalizing it, for example with copper. The copper layer is then backed, for example with tin, in order to stabilize the structure, and backlined with lead or plastic in order to make embossing die duplicate DD capable of being handled.

In a third step (FIG. 4*c*), matrices $M_1$, $M_2$, . . . and embossing die duplicates $DD_1$, $DD_2$, . . . are disposed side by side and firmly interconnected by suitable connection techniques, for example gluing, to constitute mold Z. In mold Z shown in FIG. 4*c*, each matrix and embossing die duplicate pair $M_1$, $DD_1$; $M_2$, $DD_2$, etc., constitutes a copy of steel intaglio printing plate 8 to be produced by means of mold Z. It can be seen that the microstructures, which are present here as negative microstructures 11', are located slightly above molding plane 9' of mold Z.

Molding steel intaglio printing plate 8 from mold Z (FIG. 4*d*) is again effected by galvanoplasty in corresponding fashion to the duplication of embossing die D. Additionally, printing plate surface 9 can be hardened in a further production step by nickel-plating or chromium-plating.

Figure 6A:
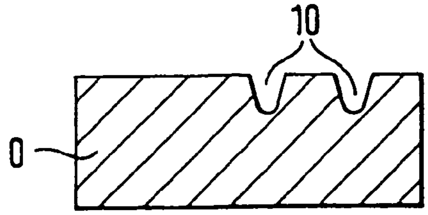
Figure 6B:
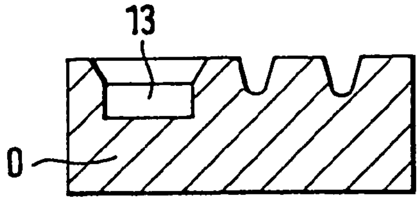
Figure 6C:
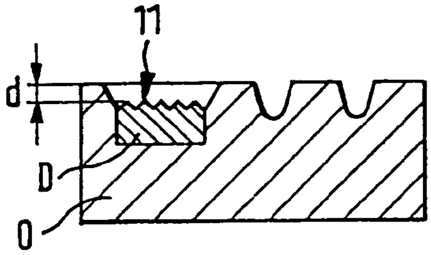
Figure 6D:
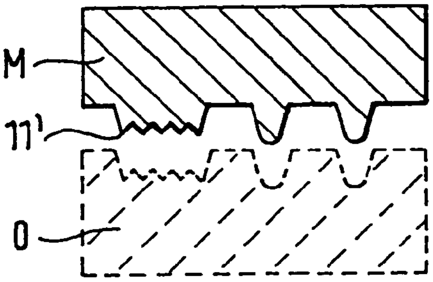
Figure 6E:
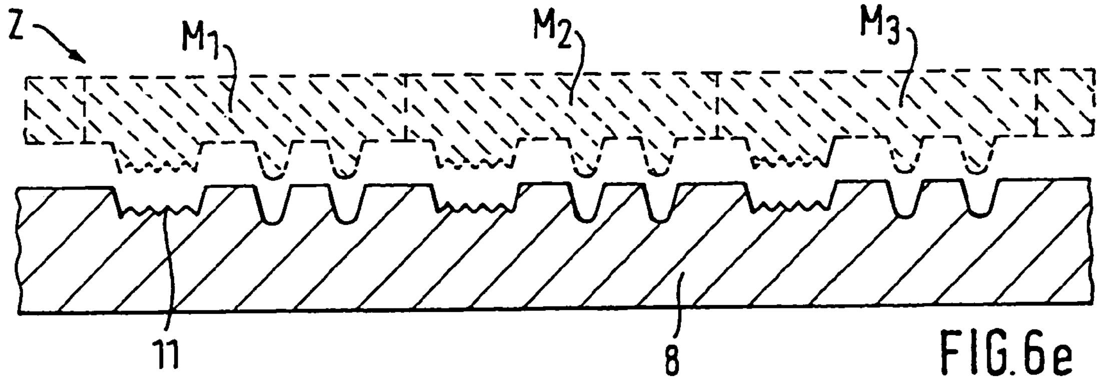

An alternative method for producing printing plate 8 is shown in FIGS. 6*a* to 6*e*. Accordingly, original printing plate O with intaglio structures 10 is first produced (FIG. 6*a*). Certain surface areas are then extracted segment by segment from original printing plate O, for example by high-precision milling technology (FIG. 6*b*). Embossing die D with microstructures 11, as shown in FIG. 4*a*, is thereupon inserted into thus produced gap 13 (FIG. 6*c*). This requires precisely fitting machining of embossing die D so that the microstructures are located deeper by defined distance d than the surface of original printing plate O after insertion of embossing die D into gap 13. Thus prepared original printing plate O is then used for embossing matrices M (FIG. 6*d*), the embossing being effected for example again by the Cobex embossing method. In this case, each matrix M is used for further production of a complete copy of steel intaglio printing plate 8 to be produced. As many matrices $M_1$, $M_2$, $M_3$, . . . are therefore produced from original printing plate O with embedded embossing die D (FIG. 6*c*) as steel intaglio printing plate 8 to be finally produced has copies. Matrices $M_1$, $M_2$, $M_3$, . . . are in turn assembled by suitable connection techniques to form mold Z (FIG. 6*e*) from which steel intaglio printing plate 8 is molded by galvanoplasty.

Alternatively, the embossing of the original plate from 6*c* into sufficiently large mold Z can be repeated in accordance with the number of desired copies. In this case the step of joining single matrices $M_1$, $M_2$, $M_3$, . . . to form mold Z can be omitted.

The aforementioned, alternative production methods are thus suitable in the same way for in turn producing positive structures 10, 11 in finished steel intaglio printing plate 8 from original steel intaglio structures 10 and original microstructures 11 via "negative structures" 10', 11' of mold Z. The production method described with respect to FIGS. 6*a* to 6*e* is preferable insofar as it is more simple to insert microstructures 11 at any place within printed image 1 by inserting corresponding embossing dies D into gaps 13 of original printing plate O (FIG. 6*c*) than to exactly assemble printing plate duplicates or matrices M with embossing die duplicates DD (FIG. 4*c*). In particular, steel intaglio printing plate 8 for producing printed image 1 with microstructure embossings 2 integrated therein, as shown in FIG. 5, can be produced especially well by a production method according to FIGS. 6*a* to 6*e*. In steel intaglio printed image 1, which is indicated only by its outer border in FIG. 5, a plurality of microstructure embossings 2 constitute a field of microstructure embossings in which individual microstructure embossings 2 are spaced a distance apart. These distances 12' are a consequence of the fact that individual microstructure areas

11 of steel intaglio printing plate 8 must not exceed a maximum size for protection from damage by a wiping cylinder and are therefore separated from each other by separation bars 12 (FIG. 4*d*). Separation bars 12 extend as far as printing plate surface 9 and have a necessary width to be able to absorb the pressure of the wiping cylinder.

The invention claimed is:

1. A steel intaglio printing plate comprising:

a printing plate surface having at least one first area with steel intaglio structures and at least one second area with embossing microstructures, and at least one of at least one of a height and a lateral structural size of the embossing microstructures is of an order of magnitude in the range of 5 to 100 microns, and at least one of a height and a lateral structural size of the embossing microstructures is of an order of magnitude of less than 1 micron such that a diffractive relief structure can be embossed therewith, wherein parts of the embossing microstructures closest to the printing plate surface are located 20 microns to 100 microns below the printing plate surface.

2. The plate according to claim 1, wherein parts of the embossing structures closest to the printing plate surface, or a molding plane, are located at least 40 microns away from the printing plate surface or molding plane, respectively.

3. The plate according to claim 1, wherein parts of the embossing structures closest to the printing plate surface, or a molding plane, are located at most 60 microns away from the printing plate surface or molding plane, respectively.

4. The plate according to claim 1, wherein the second area with embossing structures has an area size of less than 400 square millimeters.

5. The plate according to claim 4, wherein the second area with embossing structures has an area size of less than 100 square millimeters.

6. The plate according to claim 1, wherein a plurality of second areas with embossing structures constitute an embossing structure grid.

7. The plate according to claim 1, wherein the second area with embossing structures is separated from the first area with steel intaglio structures, or from another second area with embossing structures, by a separation bar extending as far as the printing plate surface or a molding plane, the separation bar having a width of at least 0.5 millimeters.

8. A method for producing a steel intaglio printing plate, comprising:

producing steel intaglio structures in a steel intaglio printing plate, producing embossing microstructures in the steel intaglio printing plate by engraving such that:

parts of the embossing microstructures closest to a surface of the steel intaglio printing plate are located 20 to 100 microns below said surface, and at least one of at least one of a height and a lateral structural size of the embossing microstructures is of an order of magnitude in the range of 5 to 100 microns, and at least one of a height and a lateral structural size of the embossing microstructures is of an order of magnitude of less than 1 micron such that a diffractive relief structure can be embossed therewith.

* * * * *